United States Patent [19]
Gelfand

[11] Patent Number: 4,679,174
[45] Date of Patent: Jul. 7, 1987

[54] METHOD FOR SEISMIC LITHOLOGIC MODELING

[75] Inventor: Valery A. Gelfand, Houston, Tex.

[73] Assignee: Western Geophysical Company of America, Houston, Tex.

[21] Appl. No.: 825,698

[22] Filed: Feb. 4, 1986

Related U.S. Application Data

[63] Continuation of Ser. No. 604,375, Apr. 26, 1984, abandoned.

[51] Int. Cl.[4] .............................................. G01V 1/30
[52] U.S. Cl. ..................................... 367/73; 367/38; 367/45; 364/578; 364/158
[58] Field of Search ....................................... 367/38

[56] References Cited

U.S. PATENT DOCUMENTS

| | | | |
|---|---|---|---|
| 3,534,400 | 10/1970 | Dahlin | 364/158 |
| 4,187,548 | 2/1980 | Gross et al. | 364/578 |
| 4,358,822 | 11/1982 | Sanchez | 364/158 |
| 4,368,510 | 1/1983 | Anderson | 364/158 |
| 4,415,999 | 11/1983 | Moeckel et al. | 367/73 |
| 4,513,384 | 4/1985 | Rosencwaig | 364/158 |

OTHER PUBLICATIONS

Gelfand et al., "Seismic Lithologic Modelling", 4/11/84, pp. 412–420, APEA, J v 24, pt 1; abst. attached.
Gelfand et al., "Seismic Lithologic Modeling", 9/11/83, p. 661, 53rd Annu. Seg. Int. Mtg., Pap. No. S 205; abst.
Gibson et al., "Migration of Seismic Data . . . Media", 1979, pp. 2655–2665, vol. 4, 11th Annu. SPE of AIME; abst.
Gelfand, "Confirmation of Seismological . . . Synthetic Seismograms", 1977, pp. 32–36, Neftegazovaya Geol. Geafiz. No. 5; abst.
Gelfand et al., "Seismic Lithologic Modeling", 11/84, pp. 30–34, Leading Edge, vol. 3, No. 11.
White, "Partial Coherence . . . Seismic Traces", 1980, pp. 333–358, Geophysical Prospecting, vol. 28.
"Interpretive Methods of Stratigraphic Modeling" by A. P. Frink et al., presented as paper OTC 2836 at the Offshore Technology Conference, May, 1977.
"Acoustic Impedance Logs Computed from Seismic Traces", M. Becquey et al., *Geophysics*, V. 44, No. 9, pp. 485–1501.

*Primary Examiner*—Nelson Moskowitz
*Attorney, Agent, or Firm*—William A. Knox

[57] ABSTRACT

A method of seismic exploration of the subsurface of the earth. Seismic reflection data are gathered in a selected area. The seismic data are combined with available non-seismic data to define an initial two-dimensional lithologic model. Based upon the initial model, a set of synthetic seismic data is generated. The degree of correspondence between the set of synthetic reflection data and the gathered seismic data is determined. The initial model-parameters are systematically perturbed during a series of iterations until a desired degree of correspondence has been achieved, resulting in a final lithologic model.

8 Claims, 8 Drawing Figures

METHOD FOR SEISMIC LITHOLOGIC MODELING

RELATION TO OTHER APPLICATIONS

This application is a continuation of application Ser. No. 604,375, filed 04/26/84, now abandoned.

BACKGROUND OF THE INVENTION

1. Field of the Invention

This invention relates to a method for creating a lithologic model of a portion of the subsurface of the earth from seismic data.

2. Discussion of the Prior Art

The goal of a seismic exploration project is to produce and display a model of the structure and texture of subsurface earth layers within an area of interest. An array of seismic sensors are laid out along a line or a grid of observation stations within a desired locality. An acoustic source is stationed in the vicinity of the sensor array at a specified location. The source injects an acoustic signal into the earth. The acoustic signal propagates downwardly into the earth and is reflected from various earth layers back to the surface where the reflected signals are detected by the sensors. The reflected signals detected by each sensor are recorded for later processing. The sensor array is then moved along the line to a new position and the process is repeated. Customarily, the analog signals from the sensors are recorded after being sampled at intervals such as every two milliseconds and are converted to digital numbers whose magnitudes are a function of analog amplitude. When sufficient seismic data have been acquired, the data are transported to a processing center. Seismic data processing is then done using digital computers. After processing, the data are displayed as wiggle traces or colored bands.

The recorded seismic data are corrected for spherical and geometric spreading and instrumental artifacts; spurious noise and multiple reverberations are removed by suitable deconvolution methods. After reduction to zero offset, the data may be displayed as a two-dimensional cross section of the earth in terms of horizontal spacing of the observation stations and vertical two-way travel time beneath each observation station. The data are shown as individual time-scale oscillograms or traces beneath each station. Significant trace excursions from an average value represent reflected wave arrivals.

The polarity and amplitude of the trace excursions are a function of the differences in acoustic impedance between rock layers, i.e., the reflection coefficient. A reflectivity series is a depth-scale plot of the polarity and magnitude of the reflection coefficients. The acoustic impedance of a rock layer is, in turn, the product of the interval acoustic propagation velocity within a particular rock layer and the density of that layer. The time of arrival of a reflected seismic event is a function of the average acoustic velocity from the surface to the rock-layer interface under consideration. The display of seismic data may be a two-dimentional structural profile of subsurface rock layers as above described or it may take the form of a three-dimensional display of the physiographic features of one or more selected rock layers.

More sophisticated displays may be produced to show lateral changes in the texture of the respective rock layers. Parameters of interest are lateral changes in density, velocity and concomitantly, the reflection coefficients. Such lateral changes are considered to be indicative of rock type (shale, sandstone, limestone) and of rock texture such as porosity and fluid content.

If there is a borehole within an area to be seismically surveyed, a depth log of direct measurements of interval velocity, rock density and other parameters may be made. From such a depth-scale log, a synthetic time-scale seismic recording may be computed. The synthetic seismic recording or seismic trace is useful for demonstrating to the geophysicist what a seismic time-scale trace ought to look like in the presence of the geologic conditions near the bore hole.

In the inverse case, from a recorded time-scale seismic trace and, given certain assumed initial conditions, one can measure seismic velocity and reflection wavelet amplitude. Using those observed parameters one can, by a suitable iterative process, derive a synthetic depth-scale velocity/density log. Such a log may be termed a pseudo acoustic impedance log and may be considered to be a one-dimensional local lithologic model of the earth.

Because the seismic data are band-limited as to frequency, the resolution of the synthetic log for thin layers is poor. A lithologic model conventionally derived from band-limited seismic data is imperfect because conventional methods involve only one-dimensional transformation of individual seismic traces, assume that the data are broadband, and make no allowance for noise.

The resolution of a lithologic earth model depends on the frequency content of the seismic data from which it was derived and on the formation velocity. Depth ambiguities between layers of several tens to as much as one-hundred feet or more may be expected because of the band-limitations of the seismic data.

Conventional seismic modeling techniques may be reviewed from "Interpretive Methods of Stratigraphic Modeling" by A. P. Frink et al., present as paper OTC 2836 at the Offshore Technology Conference, May, 1977. Another paper of interest is "Acoustic Impedance Logs Computed from Seismic Traces", M. Becquey et al., *Geophysics*, V. 44, N. 9, pp. 1485–1501.

SUMMARY OF THE INVENTION

It is an object of this invention to optimize a two-dimensional lithologic model of interest within subsurface earth layers over an extended region.

An initial model is constructed by converting a set of a plurality of successive processed seismic reflection time-scale traces as recorded at a plurality of seismic stations to a like plurality of depth-scale models in terms of the layer parameters of velocity, density, and layer thickness for a selected number of layers over a restricted time window. A set of synthetic time-scale traces is computed over the model and the result is compared with the original traces. The parameters are systematically varied one at a time in an iterative process in such a way as to reduce the difference between the synthetic and original traces. After each parameter change a new set of synthetic time-scale traces is computed over the lateral extent of the model that is influenced by that parameter. After each iteration the synthetic time scale traces are compared with original traces as recorded in the field. The average goodness of fit for all of the traces is measured. The iterations are halted when the goodness of fit reaches a targeted value or when a predetermined number of iterations has been reached.

BRIEF DESCRIPTION OF THE DRAWINGS

A better understanding of the benefits and advantages of my invention may be obtained from the appended detailed description and the drawings, wherein.

DETAILED DESCRIPTION OF THE PREFERRED EMBODIMENT

Figure 1:
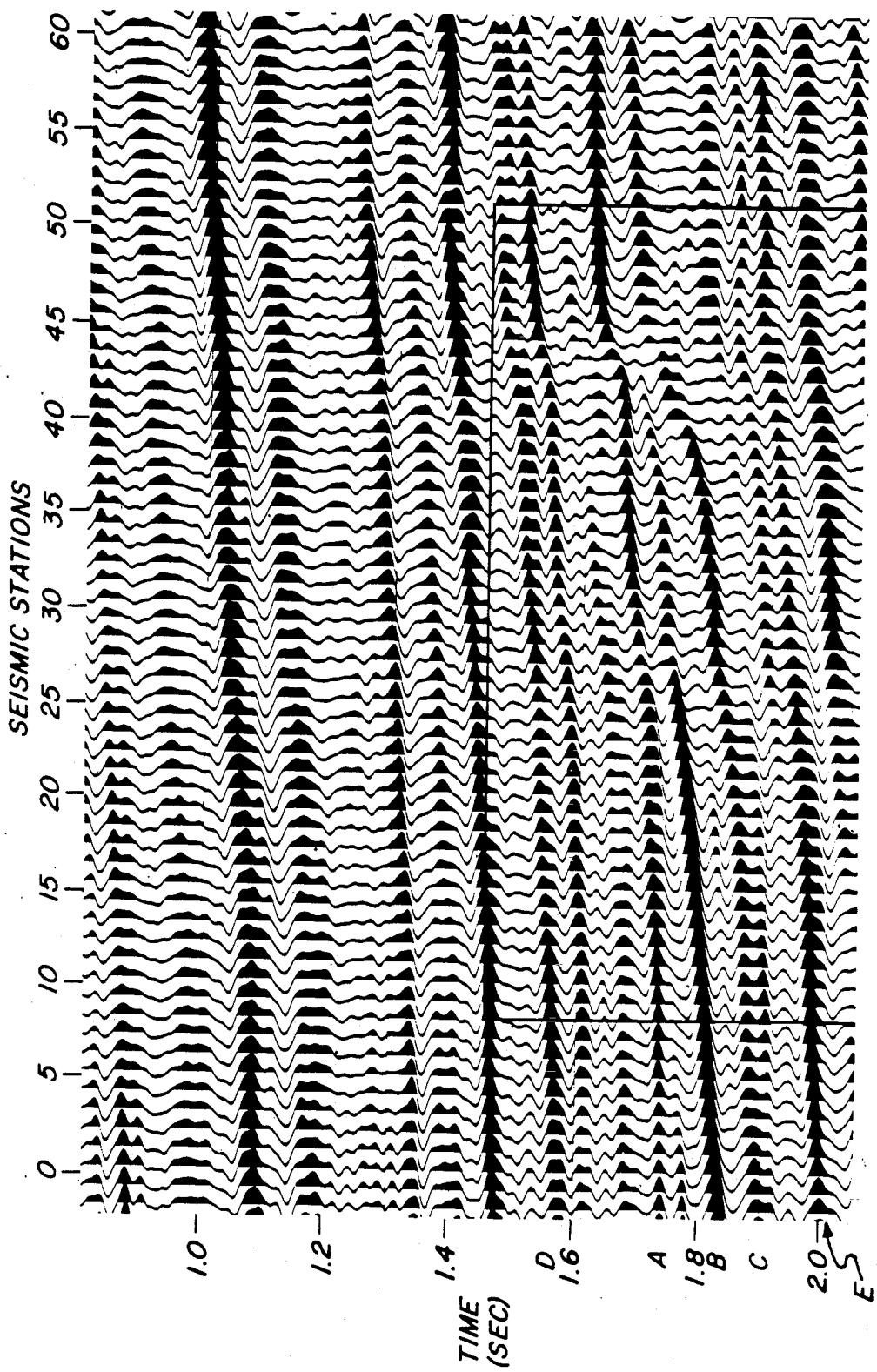
FIG. 1 is a typical section of seismic traces.

The basic data to which by process will be applied is in the form of a sequence of spatially-distributed seismic time-scale traces as gathered and recorded by seismic sensors disposed along a line or a grid to be surveyed in a desired locality. As previously described, each trace is drawn vertically as a function of two-way reflection time, beneath the seismic station whence it originated. FIG. 1 is a seismic section of recorded and processed seismic traces. Seismic station numbers 0–60 are indicated at the top of the section along the horizontal axis. Intervals of two-way reflection travel time in seconds are marked along the vertical axis.

Figure 2:
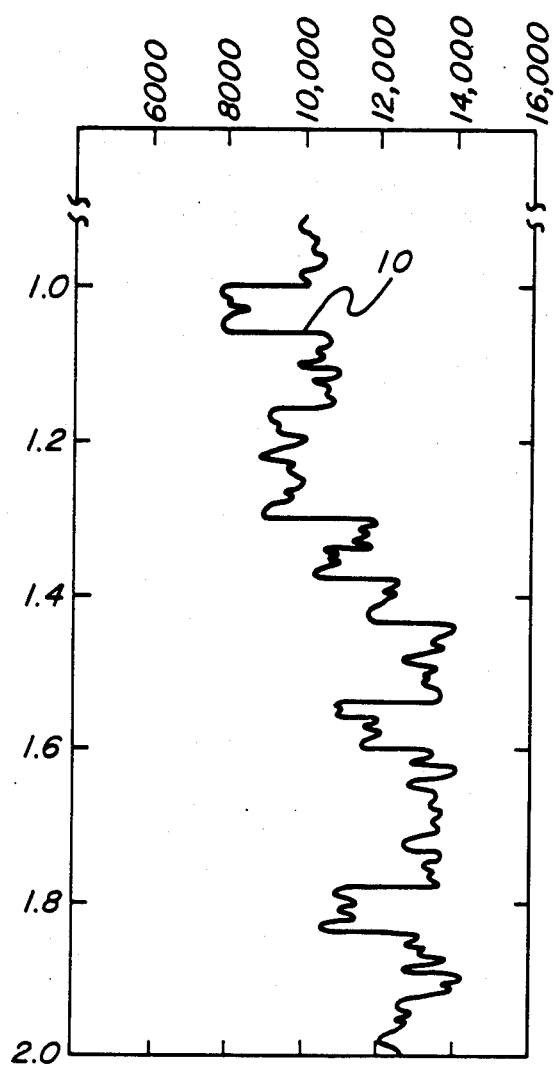
FIG. 2 represents a sonic log derived from a bore hole.

FIG. 2 is a sonic (velocity) log 10 from a bore hole. Ther vertical depth domain has been converted to the time domain with the time scale of a nearby seismic section. The more prominent reflections on a seismic section will approximately correspond to gross excursions of the sonic-log trace.

As is well known to geophysicists, the frequency spectrum of any layered earth model contains all frequencies from DC to infinity. For all practical purposes we may assume that 99% of the seismic energy is contained within the first 200 Hz of the seismic spectrum. Seismic data are band-limited, as previously stated, and therefore the informative part of the seismic energy spectrum is pratically bounded from about 5 Hz to 70 Hz. That means that a very large part of the seismic spectrum is lost. We are not able to recover the lost portion by any kind of linear transformation from a seismic time section to a depth model.

I propose a predictive-type two-dimensional lithologic modeling process that will replace some of the missing seismic spectrum.

The purpose of my modeling process is best illustrated in FIG. 1 wherein a portion of a seismic section is shown, embracing seismic stations 0 to 60 and extending in depth between about 1.0 and 2.0 seconds. Several prominent reflecting horizons stretch across the section, generally dipping to the left end of the section. The reflecting horizons down to about 1.47 seconds are clearly defined and easy to follow. In a zone of interest outlined by the black rectangle between about 1.47 and 2.85 seconds and between seismic stations 8 and 52, the reflections exhibit a complex pattern. Horizon C appears to converge towards horizon A and to possibly pinch out horizon B. At about station 40 and beyond, a poorly-resolved, low-frequency zone is seen.

As before stated, it is the purpose of my process to improve the resolution of that part of the seismic section where the high-frequency portion of the seismic spectrum is missing such as the zone to the right of station 40. In essence, I will arbitrarily insert thin layers between horizons A and C in the corresponding region of an initial, lithologic, hypothetical model. It would appear from the seismic section that at least two or three thin layers may remain between Horizons A and C. From that model, synthetic seismic traces will be generated. The lithologic parameters of the respective major layers as well as the arbitrarily-inserted thin layers will then be systematically perturbed until the goodness of fit between the derived synthetic traces and the real seismic traces reaches a desired value. The resulting more detailed lithologic model will then be accepted.

It is of course apparent that many other horizons within the zone of interest in FIG. 1 will require attention. The above discussion was confined to reflections A, B and C by way of example only.

The lithologic modeling process involves two stages: (1) A large-scale seismic data analysis based on principles of gross structure and stratigraphy; (2) A detailed analysis of a restricted portion of the large-scale structure. The first stage is simply a structural interpretation of a seismic cross section as is done routinely by geophysicists. Within the gross structural section there may be a local zone of interest embracing an anomaly that requires detailed scrutiny. Items of interest are definition of fluid content in anticlines, stratigraphic traps, facies changes, and the like. Our attention will hereafter be directed to the second stage of the process.

A geological hypothesis is created for the region embracing the anomaly of interest. Creation of the hypothesis is not confined to seismic data alone. General knowledge of the geology of the area may influence the hypothesis. If one or more bore holes are available within the area, sonic logs, resistivity logs, self-potential logs, and the like should all contribute input to the geological hypothesis along with the seismic data itself. Hereinafter, such a model of the restricted region of interest will be termed "the model".

The model is preferably limited vertically to a two-way time window of about 0.5 second (sec). At an interval velocity of about 10,000 feet per second (fps), the resulting model will be about 2500 feet thick. The time window should not be less than about four times the wavelet breadth, as will be discussed later, to avoid so-called edge effects. Homogeneous half-spaces are assumed to exist above and below the upper and lower boundaries of the model. The model is limited to a restricted time window because seismically-derived velocities are subject to cumulative errors that lead to misinterpretation of the model. Important matters are the relative changes in lateral lithologic parameters. Absolute quantities cannot be reliably determined. Another reason is purely economic: There is no point wasting computer time in scrutinizing six or eight seconds of each seismic trace when the region of interest encompasses but a half-second or less, of the traces. The model should extend laterally to include complete geologic structures of interest. But the lateral extent need not necessarily embrace the entire line of the seismic profile.

Two or more prominent seismic reflection horizons may exist within the model boundaries. The seismic horizons are assumed to be due to significant changes in interval velocity and/or density. The high-frequency portions of seismic events due to thin layers tend to be filtered out. The thick layers between prominent horizons define the initial model.

Figure 3:
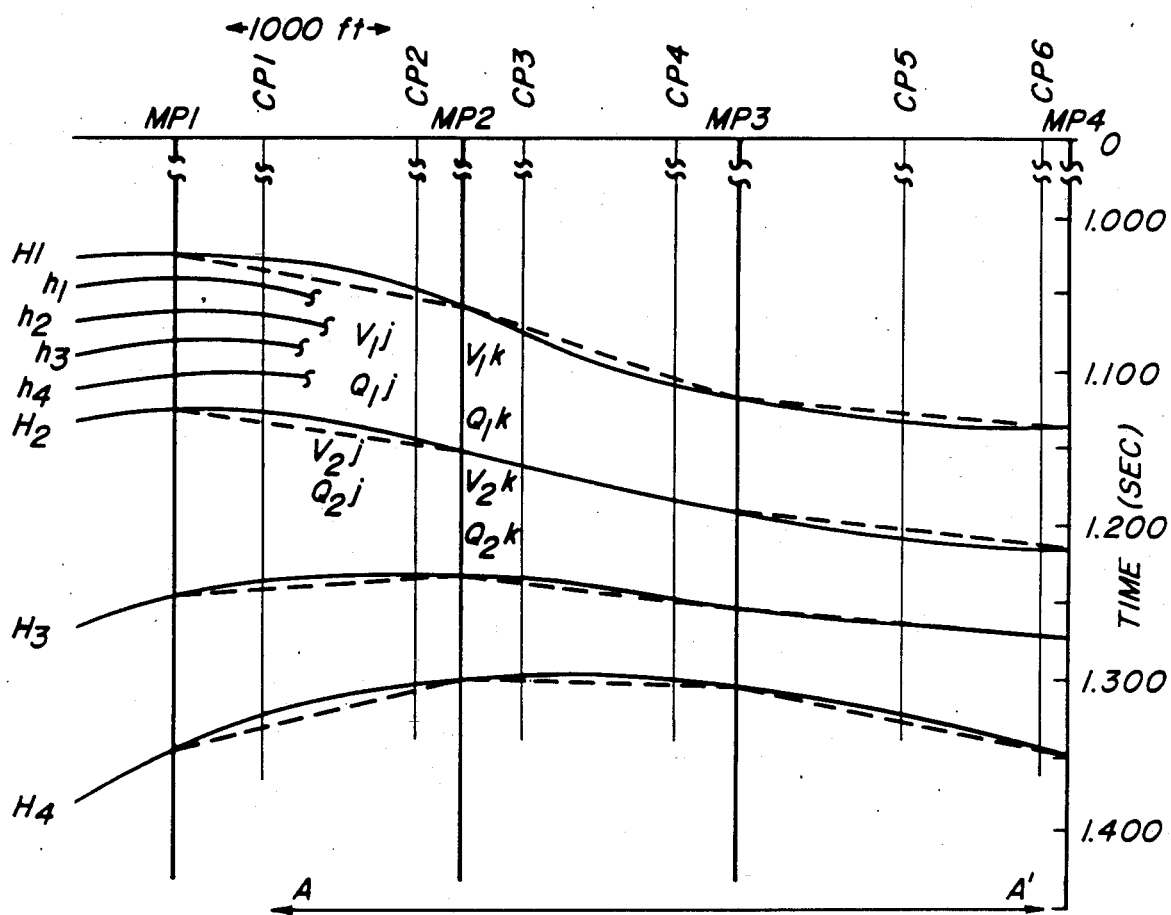
FIG. 3 shows the manner of selecting model control points.

Referring now to FIG. 3 (unrelated to FIG. 1), along the horizontal axis of a seismic section, model control points $MP_1$–$MP_4$ are established. The positions of the model control points are chosen on the basis of the gross structural profile exhibited by the thick layers. That is, model control points may be established at points of inflection of a seismically-defined structural horizon along the profile. In FIG. 3, model control points are positioned with respect to the structural attitude of four horizons H1–H4. Model control points are to be positioned such that the dips of the interfaces between the layers vary substantially linearly between any two adjacent model control points.

The model control points are used to define a two-dimensional model by specifying that model in terms of only a few selected points. If, for example, the horizons were substantially monoclinal, of relatively uniform thickness, only two model control points, one at each end of the seismic section, would be sufficient.

Between layer boundaries such as H1 and H2 in FIG. 3, the interval velocity $V_{1j}$ and the density $Q_{1j}$ are assumed to be constant in the vicinity of each model point. However, there may be a lateral velocity gradient or a density gradient such that at $MP_2$, the velocity and density have a different value $V_{1k}$ and $Q_{1k}$ and similarly for $MP_3$ and $MP_4$. Velocities and densities $V_{2j}$ and $Q_{2j}$ are established for the next layer between H2 and H3 and so on for the remaining layers and model points.

At this point, each thick layer may now be subdivided into a plurality of thinner layers initially having the same interval velocity and density. The number of thin layers may be chosen on the basis of general geologic knowledge of the area as was discussed for FIG. 1 supra. Four exemplary sublayers h1–h4 are shown at the left end of the model of FIG. 3. Although four sublayers are shown, any number of sublayers may be assumed initially so long as the assumption is geologically reasonable. The sublayers have not been extended across the profile because that would obscure certain detail to be described later. The thickness of the thin layers is prorated along the model to conform to the general structural attitude of major horizons. Pinchouts, such as suggested in FIG. 1, are allowed. That is, any one sublayer is not necessarily continuous across the section. The thickness of any thin layer should not be less than about one-tenth the dominant period of the local seismic data (see FIG. 7). The dominant period is determined from the spectrum of the seismic data. The spectrum may be found by conventional methods. Thus, if the dominant frequency is 20 Hz, the dominant wavelet period is 50 ms. The least thin-layer interval will then be 5 ms (one-way time) or about 50 feet at an interval velocity of 10,000 fps.

So far, we have provided a gross basic model of an area of interest. It now remains to correlate the proposed model with the seismic data itself.

The next step is to establish a set of calculation points $CP_i$ (i=1, 2, 3, ..., n). Calculation points are locations along the surface of the earth where quantitative values will be assigned to certain rock properties or layer parameters of velocity V, and density Q, and to model parameters such as depth D, and number of sublayers, as well as a time-tie, $t_o$ (the phase relationship, in time, between the model and the real seismic data).

Figure 4:
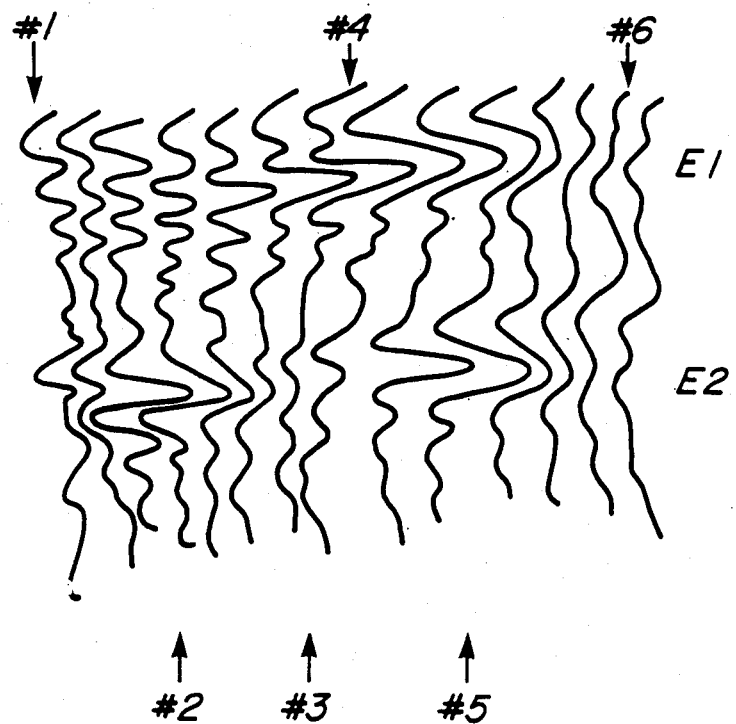
FIG. 4 shows the criteria for selecting calculation points.

Whereas the model points $MP_j$ (j=1, 2, 3, ..., n) were chosen on the basis of seismically-defined structure, the calculation points are selected on the basis of reflection-envelope characteristics, such as amplitude, as seen on the initial seismic section from which the basic model was constructed. Refer to FIG. 4. Here are shown several seismic traces, associated with which are two reflected events E1, E2. With respect to E1 significant reflection amplitude changes are seen at points #1, #4, and #6. The term "significant" is taken to mean at least a 3-dB change in amplitude. Regarding reflection E2 additional significant amplitude changes are indicated at points #2, #3 and #5 (along the bottom of the Figure). Accordingly at least six calculation points will be designated.

Lateral reflection amplitude changes often may be indicative of physical changes in one of the layer parameters above listed. For example, a series of very thin layers may pinch out and/or blend together to form a single interface. Because of the finite breadth of a seismic wavelet and because of the loss of high-frequency information due to earth or other filtering effects, the seismic wavelets due to very thin layers interfere with each other creating a low-amplitude interference pattern such as at E1, CP#1, FIG. 4, or at seismic station 40, FIG. 1, between horizons A and C. As the layers pinch out or combine into a single interface, the amplitude of a seismic wavelet due to that new, merged interface develops.

Referring back to FIG. 3, calculation points $CP_1$–$CP_6$, selected on the basis of significant seismic-trace amplitude changes, are plotted on the model at their proper positions relative to the model points MP1–MP4. A calculation point does not necessarily correspond to a seismic trace. Calculation points are usually positioned within a lateral zone of interest as shown by arrow A—A'. They are not necessarily distributed along the entire model. As before stated, the vertical interval to be analyzed (the time window) should generally not be more than about 0.5 second thick. In the case of FIG. 3, the thickness extends from about 1.0 second to about 1.4 seconds. But the vertical interval should be more than four times the dominant period of the dominant frequency of the seismic data.

At each calculation point, the initial parameters for each layer are found by interpolation between adjacent model points as shown by the dashed lines. By way of example but not by way of limitation, the interpolation algorithm may be linear. Depths to major boundaries H1–H4 as well as depths to the thin layers h1–h4 are considered. The other parameters of velocity and density are interpolated at each calculation point for the major boundaries but not for the individual thin layers because initially those thin layers are assumed to have constant velocity and density within a given thick layer. Thus initial values for $CP_1$ and $CP_2$ are found by interpolation between model points $MP_1$ and $MP_2$. Similarly we proceed for the other calculation points. Above boundary H1 and beneath H4, a homogeneous half-space is presumed.

Parameter interpolation for the calculation points between adjacent model points is most conveniently done by a digital computer. The parameter data for each model point viz.: depth, velocity, density and model-point coordinates are stored in the computer. On the basis of calculation-point coordinates relative to model point coordinates, parameters may be interpolated using any desired, well-known interpolation algorithm.

Figure 5:
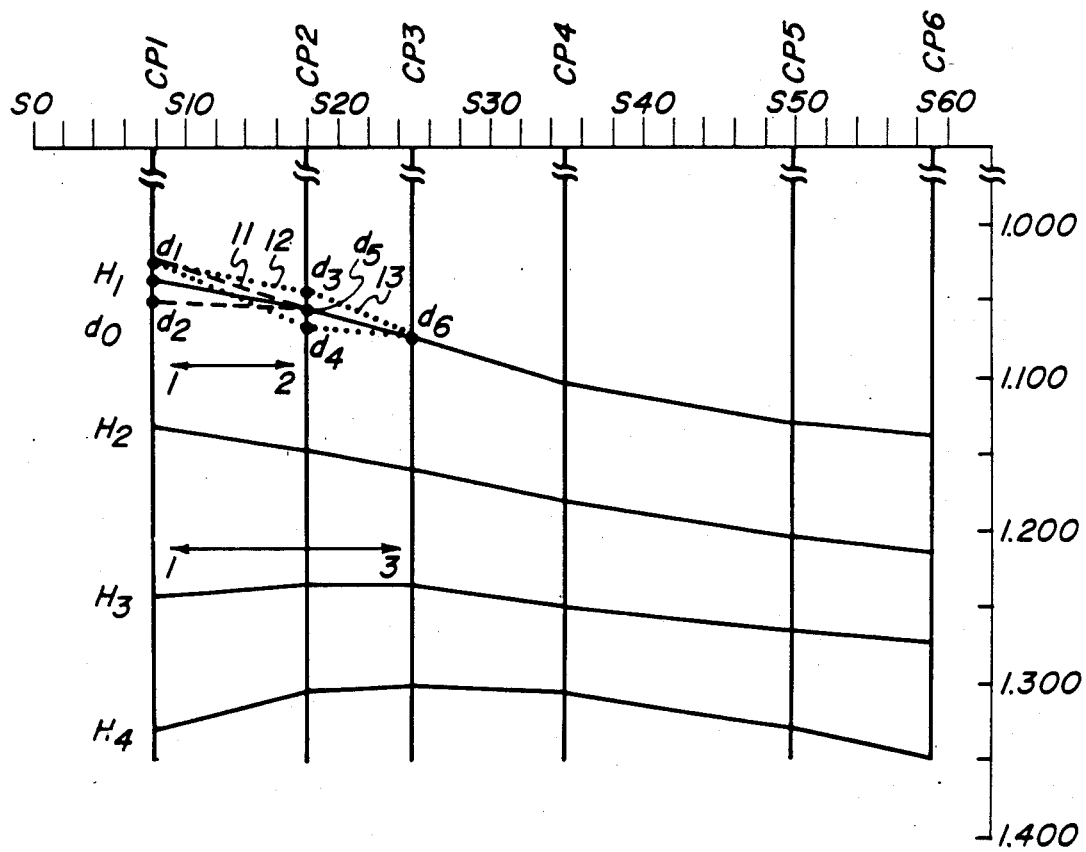
FIG. 5 illustrates calculation points as plotted after interpolation of layer parameters between adjacent model points.

Referring to FIG. 5 calculation points $CP_1$–$CP_6$ are replotted, but without the model points. The depth values to horizons H1–H4, as found by the initial interpolation from FIG. 3 are shown. Station numbers S1–S60 are plotted along the horizontal axis, the vertical axis being two-way reflection travel time. Beneath each station would be plotted a seismic trace as in FIG. 1, but the traces are not shown in FIG. 5 for clarity of protrayal of the process steps next to be explained. Thin layers h1–h4 are not shown in FIG. 5, again for tutorial clarity. However, it must be understood that such layers are to be considered in the calculation process.

From the initial interpolated parameters at each calculation point, a reflectivity series is created. The reflectivity coefficient $R_n$ for a given interface is defined as $$R_n = (Q_n V_n - Q_{n+1} V_{n+1})/(Q_n V_n + Q_{n+1} V_{n+1})$$

where
$Q_n$ = density above interface n,
$Q_{n+1}$ = density beneath interface n,
$V_n$ = interval velocity above interface n, and
$V_{n+1}$ = interval velocity beneath interface n.

Figure 6:
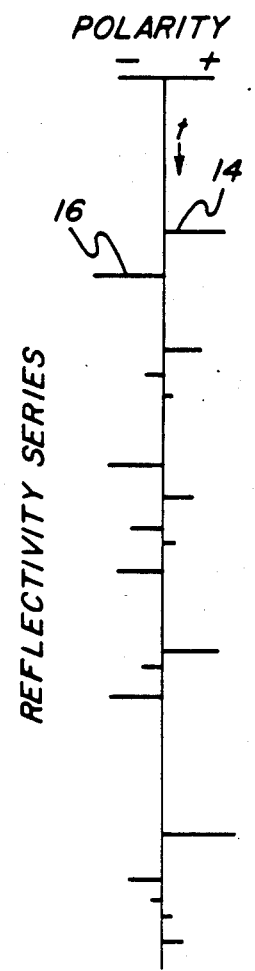
FIG. 6 is a reflectivity series derived from a calculation point.

FIG. 6 is an illustration of an exemplary reflectivity series. Each spike, such as 14 and 16, marks an interface across which a parameter change in Q and/or V occurs. The polarity, plus or minus, depends on the relative values of Q and/or V between the upper and lower layers. The length of the spike is a function of $R_n$.

A synthetic seismic trace is calculated at each of the seismic stations such as S1–S60, FIG. 5, by convolving the reflectivity series for that stato with a desired wavelet. A seismic wavelet is considered to be a modulated sinusoid S(t), a function of time t, of the form $$S(t) = P \exp(-c[t-dt]^2) \sin 2\pi ft,$$

where
P = wavelet polarity (±1),
c = measure of wavelet decay rate
dt = envelope delay, and
f = dominant frequency.

Figure 7:
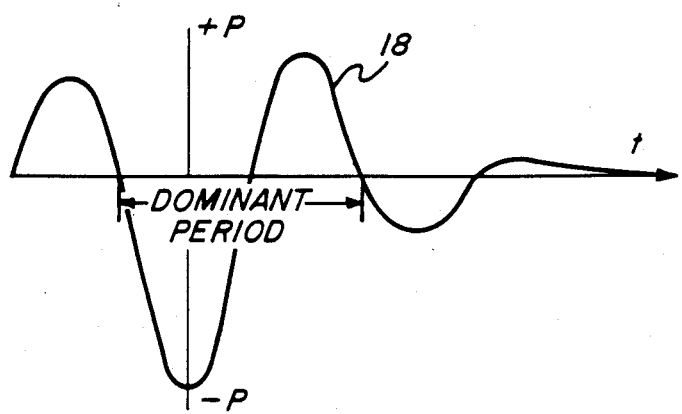
FIG. 7 is a zero-phase wavelet.

The dominant frequency f is determined from the power spectrum of the real seismic trace. For a zero-phase wavelet dt is equal to zero. A typical zero-phase wavelet 18 is shown in FIG. 7. The polarity P, of a wavelet as seen on a seismic trace is dependent upon the seismic recording instruments. In this specification, positive polarity (+1) means a positive first arrival of a wavelet due to a positive reflection coefficient.

The parameters of the seismic wavelet of FIG. 7 may be specified initially by the geophysicist or may be generated by the computer, using the initial parameters for each calculation point. The characteristics of the wavelet may be interpolated at each seismic station, between the calculation points.

The synthetic seismic traces resulting from the convolution process are compared with the real seismic traces at the corresponding seismic stations. The synthetic seismic traces are time-shifted relative to the real traces until the summed square differences between the real and the synthetic traces is a minimum. At that point, the wavelet is accepted. However, the time shift $t_o$, that is, the phase shift, should not exceed ¼ wave length of the wavelet ($\pi/2$) to avoid cycle-skipping.

In summary, thus far we have created an initial geologic model for a limited-depth portion of a two-dimensional seismic structural section. Model control points have been established at points of structural inflection (slope change). Calculation points were positioned along the section where lateral, significant changes in reflection character are observed. A series of thin beds have been interpolated between thick-layer boundaries. A desired wavelet envelope has been selected.

It now remains to systematically perturb the parameters of the respective layers a little bit, during each of a plurality of iterations, to achieve the best fit between synthetic and real traces. The ultimate purpose is of course to predict and replace missing high-frequency seismic data to improve resolution of the initial two-dimensional geologic hypothesis.

For the initial iteration, based upon interpolation between calculation points a synthetic seismic trace is produced for each seismic station by convolving the accepted seismic wavelet with the reflectivity series as defined at each station by interpolation of parameters between successive calculation points.

The synthetic traces are then compared with the real seismic traces to find the degree of correspondence, that is, the best goodness of fit, such as the minimum of the sum over all traces of the sum-square differences, b, where for each trace $$b = \frac{1}{n} \operatorname*{Sum}_{i=1}^{n} (A_i - q\overline{A}_{i+j})^2,$$

and
A = real seismic trace samples,
$\overline{A}$ = synthetic trace samples,
n = number of samples in the time window,
i = running sample index, i = 1, 2, 3, . . . , n
j = shift index, j = 0, 1, 2, . . . , k
q = normalizing coefficient.

The significance of all of the above parameters are well known except perhaps, j. The index j is of the nature of a time-tie shift or phase shift of the synthetic trace relative to the real trace. The index may not exceed k, the number of data-sample increments less than a time interval equal to ¼ the breadth ($\pi/2$) of the seismic wavelet.

For the initial iteration, the thin layers inserted within thick layers will not be recognized on the seismic section because of the assumption that initially, the velocity and density parameters were assumed to be constant. However, as iterations proceed, along with concomitant changes in parameters, those layers will begin to influence the synthetic traces.

Referring back to FIG. 5, we begin the first iteration after the initial processing by changing, for example the depth parameter for horizon H1 at calculation point $CP_1$. First we reduce the depth of H1, as shown by the upper dashed line, to d1. The incremental change in depth is small, ten to 20 feet. The change in depth is linearly interpolated for all traces within the zone of influence (arrow 1-2) of the change, in this case the zone of influence is from $CP_1$ to $CP_2$. Synthetic traces are computed and the average sum-square difference, $b_{avg}$, is determined for all of the traces within the zone of influence. If $b_{avg}^{new}$ is less than the $b_{avg}^{old}$ as determined from the initial iteration, the change is accepted; if not, a new change is tried by increasing the depth parameter a little bit to $d_2$. A second $b_{avg}^{new}$ is determined. If $b_{avg}^{new}$ is less than $b_{avg}^{old}$, the change is accepted and $b_{avg}^{new}$ replaces $b_{avg}^{old}$. If $b_{avg}^{new}$ is greater than $b_{avg}^{old}$, the original depth $d_o$ is accepted and we progress along the same layer H1 to the next calculation point $CP_2$.

For purposes of example, let it be assumed that at $CP_1$, a perturbation in depth to $d_1$, horizon H1, produced the best goodness of fit. At $CP_2$, the zone of influence extends from $CP_1$ to $CP_3$ (arrow 1-3). At $CP_2$, the depth parameter for horizon H1 is perturbed to $d_3$ relative to $d_1$ at $CP_1$ and $d_5$, the initial depth parameter for H1 and $CP_3$. Synthetic traces are computed and the average minimum square difference $b_{avg}$ is calculated for all traces within the zone of interest as shown by the dotted lines 12, 13. If $d_3$ is not found acceptable, a new depth $d_4$ of the opposite polarity is tried. If that depth is unacceptable, the initial depth $d_5$ is retained as the depth parameter for horizon H1 and $CP_2$.

The above process is repeated for horizon H1 at the remaining calculation points $CP_3$-$CP_6$. At each successive calculation point, the chosen parameter is perturbed relative to the last acceptable perturbation at calculation points on each side of the calculation point under consideration.

The above steps are repeated for every calculation point, for every layer and for every desired parameter of depth, velocity, and density. Any one incremental perturbation is limited within a narrow range such as 10 to 20 feet for depth, 250 fps for velocity and 0.05 g/cm$^3$ for density. The cumulative value of all of the incremental perturbations should not exceed a specified limit. The specified limit is based upon known geologic realities. Although for exemplary reasons in FIG. 5, the depth parameter was perturbed first, the order of parameter perturbation is optional.

In the example of FIGS. 3 and 5, four major layer boundaries were assumed with several thin sublayers being interpolated within the thick layers. In the ultimate case, only an upper and a lower boundary might be assumed. For example, in FIG. 1, only the interfaces represented by reflections D and E might be specified as an initial hypothesis. Fifteen or twenty sublayers might then be interpolated within the single thick layer provided only that the thickness of the sublayers are not less than one-tenth the period of the dominant wavelet. After a few iterations, the fine structural detail of FIG. 1 will emerge. The procedure in attempting to find the best fit between synthetic and real seismic traces, has the capability for merging two or more layers together to create a sophisticated configuration for the final display of features such as pinch-outs.

After a new geologic (lithologic) model has been completed for every layer and after every parameter has been systematically perturbed by one discrete increment during a first iteration, a second iteration may be performed. The iterative process may be continued until the correlation coefficients can no longer be minimized. Usually, after a user-specified number of iterations has been accomplished, such as seven, the process is terminated.

Figure 8:
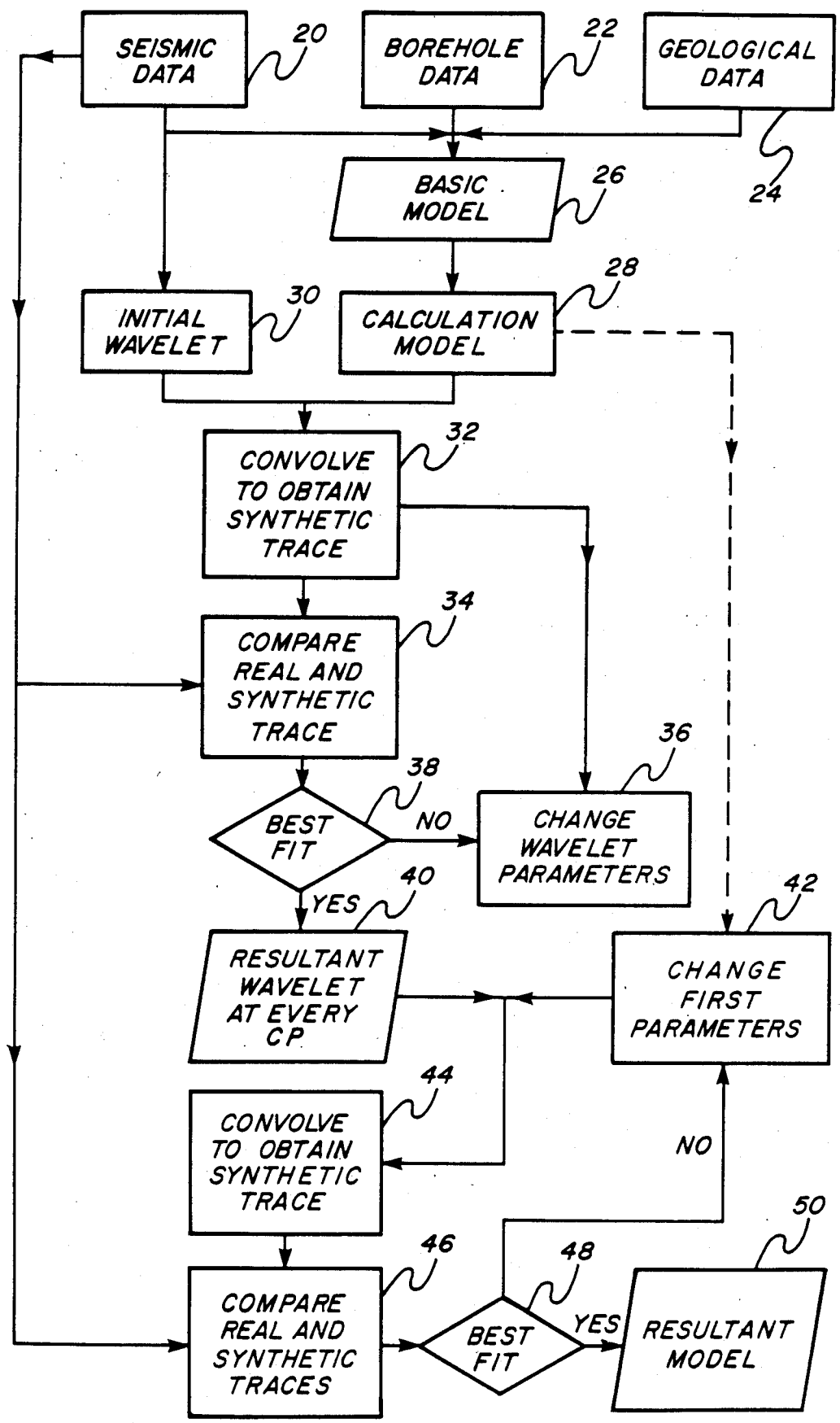
FIG. 8 is a flow diagram for computer implementation of the process of this disclosure.

As the reader can readily appreciate, the iterative process as outlined, requires a very large amount of detailed computation. Therefore the process perforce is done by computer for the purpose of transforming seismic traces to a geologic model. FIG. 8 is a flow diagram of the process as implemented by computer.

In FIG. 8, initially, all seismic data 20 and available lithologic data 22, 24 are assembled to create a basic model 26 that includes the parameters pertinent to each model point. From basic model 26, calculation models 28 at selected calculation points are derived by interpolation. An initial wavelet 30 is derived from the real seismic data or it may be user-specified. A synthetic trace is then generated by convolving at step 32 the initial wavelet with the reflectivity series determined for each calculation point. The real and synthetic data are compared at step 34. Wavelet parameters may then be perturbed at 36 until the best fit in step 38 is found between the synthetic and real traces.

Having determined the best-fitting wavelet 40 for each calculation point, that wavelet is convolved at step 44 with the reflectivity series at each seismic station to determine synthetic traces. The respective model parameters are systematically perturbed at 42 during each of a plurality of iterations. After each iteration, the real and synthetic seismic traces are compared at 46 to optimize the goodness of fit therebetween at step 48. Iterations are terminated when the best fit is finally achieved at 50 or after a preselected number of iterations has been completed.

In this disclosure, black-and-white wiggle-trace representations of the data have been presented. However, it is preferable to employ color of various shades and hues. Variable-amplitude seismic traces suffer from a lack of dynamic range. The physical trace amplitude for the largest signal must be held within manageable bounds, say 0.5 inch. Since the dynamic range of the signals may be as much as 40 dB or more, a very weak signal would be barely visible if at all. Modern color plotters on the other hand are capable of exhibiting 75 to 100 distinct shades. Thus, by color-coding the displayed data as a function of signal level, subtle lithologic trends may more readily be identified. A color plot is the preferred display mode.

For illustrative purposes, my invention has been described with a certain degree of specificity. Variations will occur to those skilled in the art but which may be included within the scope and spirit of this invention which is limited only by the appended claims.

I claim as my invention:

1. A method for optimizing a lithologic model of subsurface earth layers, said lithologic model being derived from a real previously fully migrated seismic section consisting of a plurality of real wavelet-processed, zero-offset seismic traces from a corresponding plurality of seismic stations distributed in a survey area at or near the surface of the earth, comprising:

preparing an initial lithologic model of subsurface earth layers by combining non-seismic data with the lithologic model derived from seismic recordings;

assigning an initial set of layer parameters to said subsurface earth layers;

selecting a plurality of model points among the plurality of seismic stations in the survey area;

establishing a plurality of calculation points between said model points within a zone of interest within said subsurface earth layers;

assigning layer parameters to the subsurface earth layers at each said calculation point by interpolation between adjacent model points;

calculating a reflectivity series at each said seismic station within said zone of interest by interpolation of layer parameters between calculation points;

generating a synthetic seismic trace from said reflectivity series at each said seismic station to create a synthetic seismic section;

measuring the goodness of fit between said synthetic seismic section and a corresponding real seismic section;

systematically perturbing the layer parameters, at each said calculation point;

generating new synthetic seismic traces after each perturbation to create a new synthetic seismic section and measuring the average goodness of fit between said new synthetic seismic section and said real seismic section;

continuing the perturbative process until the average goodness of fit between said synthetic and real seismic sections is optimized to create an optimal lithologic model; and displaying said optimal model.

2. The method of optimizing a lithologic model as defined by claim 1, comprising:

determining the dominant frequency of the spectrum of the seismic traces at each calculation point from the real seismic traces adjacent said calculation point;

calculating a model wavelet having characteristics determined on the basis of the layer parameters and said dominant frequency.

3. The method of optimizing a lithologic model as defined in claim 2, comprising:

defining a reflectivity series at each said calculation point from said layer parameters;

convolving said model wavelet with the reflectivity series to generate a synthetic seismic trace;

measuring the goodness of fit between said synthetic trace and adjacent real seismic traces; and optimizing the goodness of fit between said synthetic trace and said adjacent real seismic traces by iteratively altering the characteristics of said model wavelet.

4. The method of optimizing a lithologic model as defined by claim 1, wherein:

said layer parameters include the rock properties of interval velocity and density; and said layer parameters further include the model parameters of depth and number of layers within the confines of said lithologic model.

5. The method of optimizing a lithologic model as defined by claim 3, wherein:

said zone of interest includes a reflection time window at least four times the period of said seismic wavelet model.

6. The method of optimizing a lithologic model as defined by claim 1, wherein:

said calculation point locations are established on the basis of significant changes in reflection characteristics as observed on real seismic traces between seismic station locations.

7. The method of optimizing a lithologic model as defined by claim 6, wherein:

the locations of said model points are selected on the basis of the structural configuration of said earth layers as determined from seismic data upon which said initial model is based.

8. The method of optimizing a lithologic model as defined by claim 3, wherein:

the step of measuring the goodness of fit between a synthetic seismic trace and adjacent real seismic traces includes minimizing the phase shift between said synthetic and real seismic traces.

* * * * *